United States Patent
Raji

(10) Patent No.: US 8,728,336 B2
(45) Date of Patent: *May 20, 2014

(54) PRINTED MASKING PROCESS

(75) Inventor: Edris Raji, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,385

(22) Filed: Aug. 20, 2012

(65) Prior Publication Data

US 2013/0020282 A1 Jan. 24, 2013

Related U.S. Application Data

(63) Continuation of application No. 12/714,638, filed on Mar. 1, 2010.

(51) Int. Cl.
*C03C 15/00* (2006.01)

(52) U.S. Cl.
USPC .......... 216/41; 216/48; 216/49; 216/106; 156/345.1

(58) Field of Classification Search
USPC .......... 216/41, 47, 49, 65, 66, 106, 107, 48; 156/345.1, 11, 345.11; 430/300, 302, 430/308
See application file for complete search history.

(56) References Cited

U.S. PATENT DOCUMENTS

| | | | |
|---|---|---|---|
| 2,739,047 A | 3/1956 | Sanz | |
| 2,881,059 A | 4/1959 | Spencer | |
| 2,940,838 A | 6/1960 | Snyder et al. | |
| 3,061,494 A | 10/1962 | Snyder et al. | |
| 3,227,589 A | 1/1966 | Deutsch | |
| 3,380,863 A | 4/1968 | Silberberg | |
| 4,137,118 A | 1/1979 | Brimm | |
| 4,155,801 A | 5/1979 | Provancher | |
| 4,301,194 A * | 11/1981 | Borja et al. | 427/154 |
| 4,401,367 A | 8/1983 | Grantham et al. | |
| 4,523,973 A | 6/1985 | Nelson | |
| 4,585,519 A | 4/1986 | Jaffe et al. | |
| 4,716,270 A | 12/1987 | Gnanamuthu et al. | |
| 4,921,565 A | 5/1990 | Slysh | |
| 5,122,242 A | 6/1992 | Slysh | |
| 5,173,392 A | 12/1992 | Miersch et al. | |

(Continued)

FOREIGN PATENT DOCUMENTS

| | | |
|---|---|---|
| EP | 1239059 A2 | 9/2002 |
| EP | 1356892 B1 | 3/2006 |
| WO | 96/00315 A1 | 1/1996 |

OTHER PUBLICATIONS

EP Search Reported dated Jun. 14, 2011.

(Continued)

*Primary Examiner* — Lan Vinh
(74) *Attorney, Agent, or Firm* — Carlson, Gaskey & Olds, P.C.

(57) ABSTRACT

A method of chemically milling a workpiece includes the step of depositing a masking material on portions of a workpiece according to a predefined masking pattern such that other portions of the workpiece that are desired to be milled are unmasked. The masking material is deposited using a masking printer that moves in three dimensions to deposit the masking material onto the workpiece. The method also includes the step of chemically removing material from unmasked desired milling areas of the workpiece.

20 Claims, 2 Drawing Sheets

(56) References Cited

U.S. PATENT DOCUMENTS

| | | | |
|---|---|---|---|
| 5,238,752 A | 8/1993 | Duderstadt et al. | |
| 5,565,035 A | 10/1996 | Sylvestro et al. | |
| 5,951,882 A | 9/1999 | Simmons et al. | |
| 6,107,004 A * | 8/2000 | Donadio, III | 430/320 |
| 6,156,133 A * | 12/2000 | Czech et al. | 148/525 |
| 6,273,676 B1 | 8/2001 | Brooks et al. | |
| 6,403,157 B2 | 6/2002 | Ireland et al. | |
| 6,689,487 B2 | 2/2004 | Murphy | |
| 6,793,968 B1 | 9/2004 | Reymann | |
| 7,626,732 B2 * | 12/2009 | Grinberg et al. | 358/3.29 |
| 2008/0264897 A1 | 10/2008 | Hardwicke et al. | |
| 2009/0104384 A1 * | 4/2009 | Nakao et al. | 428/32.18 |

OTHER PUBLICATIONS

Francis R.G.—Numerical Control Society: The Application of Low-Cost CAD/CAM Systems to the Design, Manufacture and Marketing of Machine Tools, NC CADCAM: The Vehicle to Improved Productivity. Dearborn. Apr. 18-21, 1982, vol. Proc. 19, Apr. 1, 1982, pp. 298-314—XP000744666.

* cited by examiner

PRINTED MASKING PROCESS

REFERENCE TO RELATED APPLICATIONS

This application is a continuation of U.S. application Ser. No. 12/714,638 filed on Mar. 1, 2010.

STATEMENT REGARDING FEDERALLY SPONSORED RESEARCH OR DEVELOPMENT

This invention was made with government support under Contract No. N00019-02-C-3003 awarded by the United States Navy. The Government may therefore have certain rights in this invention.

BACKGROUND OF THE INVENTION

This disclosure relates to milling, and more particularly to a printed masking process that may be used to perform chemical milling. Chemical milling is used performed to remove undesired material from a workpiece to form channels or patterns, for example. Chemical milling typically involves masking an entire workpiece, etching a pattern onto the masking, using a scalpel to manually remove portions of the masking according to the etching and dipping the workpiece in a chemical bath to remove material from the unmasked portions of the workpiece.

SUMMARY OF THE INVENTION

A method of chemically milling a workpiece includes the step of depositing a masking material on portions of a workpiece according to a predefined masking pattern such that other portions of the workpiece that are desired to be milled are unmasked. The masking material is deposited using a masking printer that moves in three dimensions to deposit the masking material onto the workpiece. The method also includes the step of chemically removing material from unmasked desired milling areas of the workpiece.

In a further non-limited embodiment of any of the forgoing method embodiments, the method may include removing the masking pattern from masked portions of the workpiece.

In a further non-limited embodiment of any of the forgoing method embodiments, the method may include depositing a masking material on portions of a curved surface of the workpiece.

In a further non-limited embodiment of any of the forgoing method embodiments, the method may include depositing a masking material on portions of the workpiece in an isogrid pattern on portions of the workpiece.

In a further non-limited embodiment of any of the forgoing method embodiments, the method may include depositing a masking material on portions of the workpiece by depositing an elastomer dissolved in at least one organic solvent on portions of the workpiece.

In a further non-limited embodiment of any of the forgoing method embodiments, the method may include depositing a masking material on portions of the workpiece by depositing at least one organic solvent selected from a group consisting of toluene, xylene, perchloroethylene, and combinations thereof.

In a further non-limited embodiment of any of the forgoing method embodiments, the method may include chemically removing material from the unmasked desired milling areas of the workpiece by subjecting the workpiece to a chemical bath that includes an aqueous solution of acid.

In a further non-limited embodiment of any of the forgoing method embodiments, the acid includes ferric chloride.

In a further non-limited embodiment of any of the forgoing method embodiments, the method may include removing the masking material from the portion of the workpiece by a power washing process that sprays the masking material off the workpiece.

A system for milling a workpiece includes a computer having a storage module that stores at least one predefined masking pattern and a masking printer in communication with the computer. The masking printer is operable to apply masking material to portions of a workpiece according to the at least one predefined masking pattern such that other portions of the workpiece that are desired to be milled are unmasked. The masking printer moves in three dimensions to deposit the masking material onto the workpiece.

In a further non-limited embodiment of any of the forgoing system embodiments, the system may include a milling chemical operable to remove portions of a surface of unmasked desired milling areas and a chemical bath in which the milling chemical is applied to the workpiece, and the chemical bath includes an aqueous solution of acid.

In a further non-limited embodiment of any of the forgoing system embodiments, the acid may include ferric chloride.

In a further non-limited embodiment of any of the forgoing system embodiments, the system may include a workpiece that is a duct for a gas turbine engine.

In a further non-limited embodiment of any of the forgoing system embodiments, the system may include at least one predefined masking pattern includes an isogrid pattern.

In a further non-limited embodiment of any of the forgoing system embodiments, the system may include masking material including an elastomer dissolved in at least one organic solvent.

In a further non-limited embodiment of any of the forgoing system embodiments, the system may include at least one organic solvent selected from a group consisting of toluene, xylene, perchloroethylene, and combinations thereof.

These and other features of the present invention can be best understood from the following specification and drawings, the following of which is a brief description.

DETAILED DESCRIPTION OF THE PREFERRED EMBODIMENTS

Figure 1:
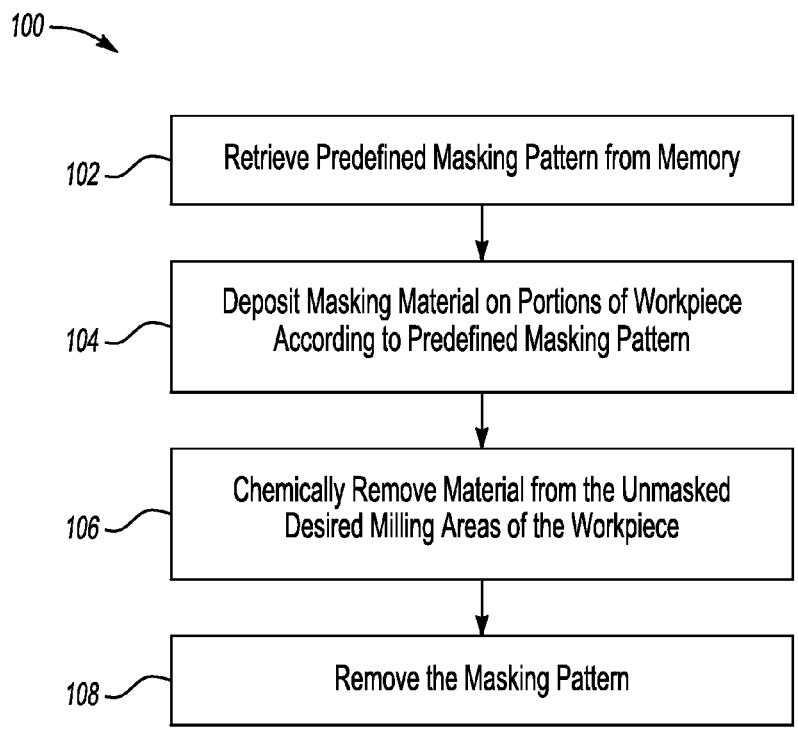
FIG. 1 schematically illustrates a method of chemically milling a workpiece.
Figure 2:
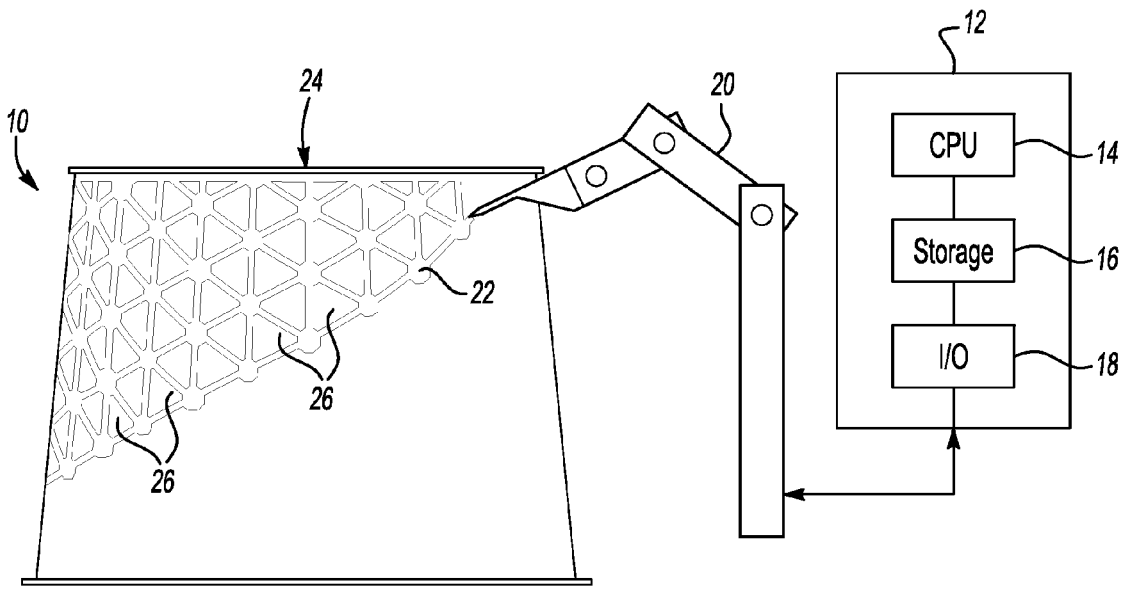
FIG. 2 schematically illustrates a system operable to perform the method of FIG. 1.

FIG. 1 schematically illustrates a method 100 of chemically milling a workpiece, and FIG. 2 schematically illustrates a system 10 for performing the method 100. The method 100 may be used in conjunction with the system 10 to chemically mill or etch a workpiece to product an isogrid rib formation on a duct, or to produce raised lettering on a sign, for example.

The system 10 includes a computer 12 having a CPU 14, a storage module 16, and an input/output ("I/O") module 18. The storage module 16 could include, for example, memory, hard drives, or any electronic, optical, magnetic or other type of computer storage. At least one predefined masking pattern is stored in the storage module 16. The at least one predefined masking pattern is retrieved from the storage module 16 (step 102). In one example the at least one predefined masking pattern includes one or more computer-aided design ("CAD") models.

A three-dimensional masking printer 20 is in communication with the computer 12. The masking printer 20 deposits a masking material 22 onto portions of the workpiece 24 according to the at least one masking pattern (step 104). The masking printer 20 is movable in three dimensions, and is operable to deposit the masking material 22 onto the workpiece 24. In one example the masking material 22 is an elastomer dissolved in at least one organic solvent. In one example, the at least one organic solvent is selected from a group consisting of toluene, xylene, perchloroethylene, and combinations thereof. Of course, other masking materials could be used.

Once the predefined pattern has been formed on the workpiece 24, material from the unmasked desired milling areas 26 of the workpiece 24 is chemically removed (step 106). In one example, step 106 includes applying chemicals to the workpiece 24, such as in a chemical bath. In one example the chemicals applied to the workpiece in step 106 include an aqueous solution of acid such as ferric chloride. Of course, other milling chemicals could be used. An amount of material that is chemically removed from the workpiece 24 in step 106 may be controlled by adjusting the duration of the chemical bath.

Once a desired amount of material has been chemically removed from the unmasked areas, the masking material may be removed (step 108). In one example, step 108 includes a power washing process that sprays the masking material off.

Unlike masking an entire workpiece and then manually removing maskant by hand with a scalpel, which is a labor-intensive and error prone process, the method 100 facilitates removing the human error component, using less masking material, reducing cost and improving efficiency and accuracy.

Figure 3:
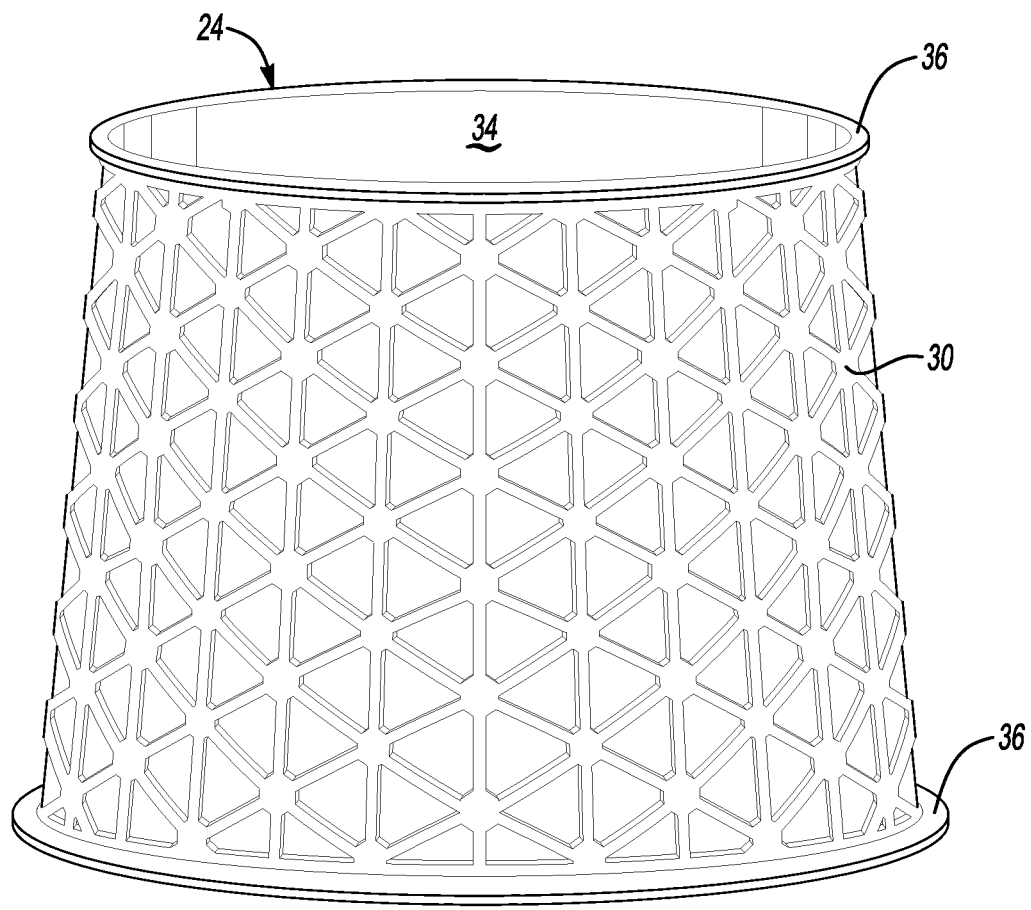
FIG. 3 schematically illustrates an example chemically milled workpiece.

The method 100 is widely applicable to many applications in which chemical milling or machining is desired. For example, as shown in FIGS. 2-3, the workpiece 24 is a duct for a gas turbine engine that may be used to contain high pressure gases within the gas turbine engine. The method 100 may be used to form an elevated isogrid 30 on the duct, with the elevated isogrid 30, an inside 34 of the duct, and flanges 36 corresponding to the masked areas of step 104. The elevated isogrid 30 pattern may be chosen because it can build structural strength on the duct. Of course, other patterns could be used.

Also, although a duct for a gas turbine engine has been illustrated, the method 100 is applicable to other types of workpieces or substrates. For example, the workpiece could be a sign, a medical device, a body of a component, a coating, a fuel cell, a heat sink, a sensor, or any other component that would benefit from precision chemical milling or machining.

Although embodiments have been disclosed, a worker of ordinary skill in this art would recognize that certain modifications would come within the scope of this disclosure. For that reason, the following claims should be studied to determine the true scope and content of this invention.

What is claimed is:

1. A method of chemically milling a workpiece, comprising:
    depositing a masking material on portions of a workpiece according to a predefined masking pattern such that other portions of the workpiece that are desired to be milled are unmasked, wherein the masking material is deposited using a masking printer that moves in three dimensions to deposit the masking material onto the workpiece; and
    chemically removing material from unmasked desired milling areas of the workpiece.

2. The method of claim 1, including:
    removing the masking pattern from masked portions of the workpiece.

3. The method of claim 1, wherein said depositing a masking material on portions of the workpiece includes:
    depositing the masking material on a curved surface of the workpiece.

4. The method of claim 1, wherein said depositing a masking material on portions of the workpiece includes:
    depositing the masking material in an isogrid pattern on portions of the workpiece.

5. The method of claim 1, wherein said depositing a masking material on portions of the workpiece includes:
    depositing an elastomer dissolved in at least one organic solvent on portions of the workpiece.

6. The method of claim 5, wherein said depositing a masking material on portions of the workpiece includes:
    depositing at least one organic solvent selected from a group consisting of toluene, xylene, perchloroethylene, and combinations thereof.

7. The method of claim 1, wherein said chemically removing material from the unmasked desired milling areas of the workpiece includes subjecting the workpiece to a chemical bath that includes an aqueous solution of acid.

8. The method of claim 7, wherein the acid includes ferric chloride.

9. The method as recited in claim 1, including:
    removing the masking material from the portion of the workpiece by a power washing process that sprays the masking material off the workpiece.

10. A system for milling a workpiece, comprising:
    a computer having a storage module that stores at least one predefined masking pattern; and
    a masking printer in communication with the computer, the masking printer being operable to apply masking material to portions of a workpiece according to the at least one predefined masking pattern such that other portions of the workpiece that are desired to be milled are unmasked, wherein the masking printer moves in three dimensions to deposit the masking material onto the workpiece.

11. The system of claim 10, including:
    a milling chemical operable to remove portions of a surface of unmasked desired milling areas;
    a chemical bath in which the milling chemical is applied to the workpiece, the chemical bath including an aqueous solution of acid.

12. The system of claim 11, wherein the acid includes ferric chloride.

13. The system of claim 10, wherein the workpiece is a duct for a gas turbine engine.

14. The system of claim 10, wherein the at least one predefined masking pattern includes an isogrid pattern.

15. The system of claim 10, wherein the masking material includes an elastomer dissolved in at least one organic solvent.

16. The system of claim 15, wherein the at least one organic solvent is selected from a group consisting of toluene, xylene, perchloroethylene, and combinations thereof.

17. The method as recited in claim 1, including:
removing the masking material from the portion of the workpiece by a power washing spray that sprays the masking material off the workpiece.

18. The method as recited in claim 1, wherein the masking material is applied directly to the workpiece.

19. The system as recited in claim 10, including a power washing that removes the masking material from the portion of the workpiece by spraying the masking material off the workpiece.

20. The system as recited in claim 10, wherein the masking material is applied directly to the workpiece.

\* \* \* \* \*